Figure 1:
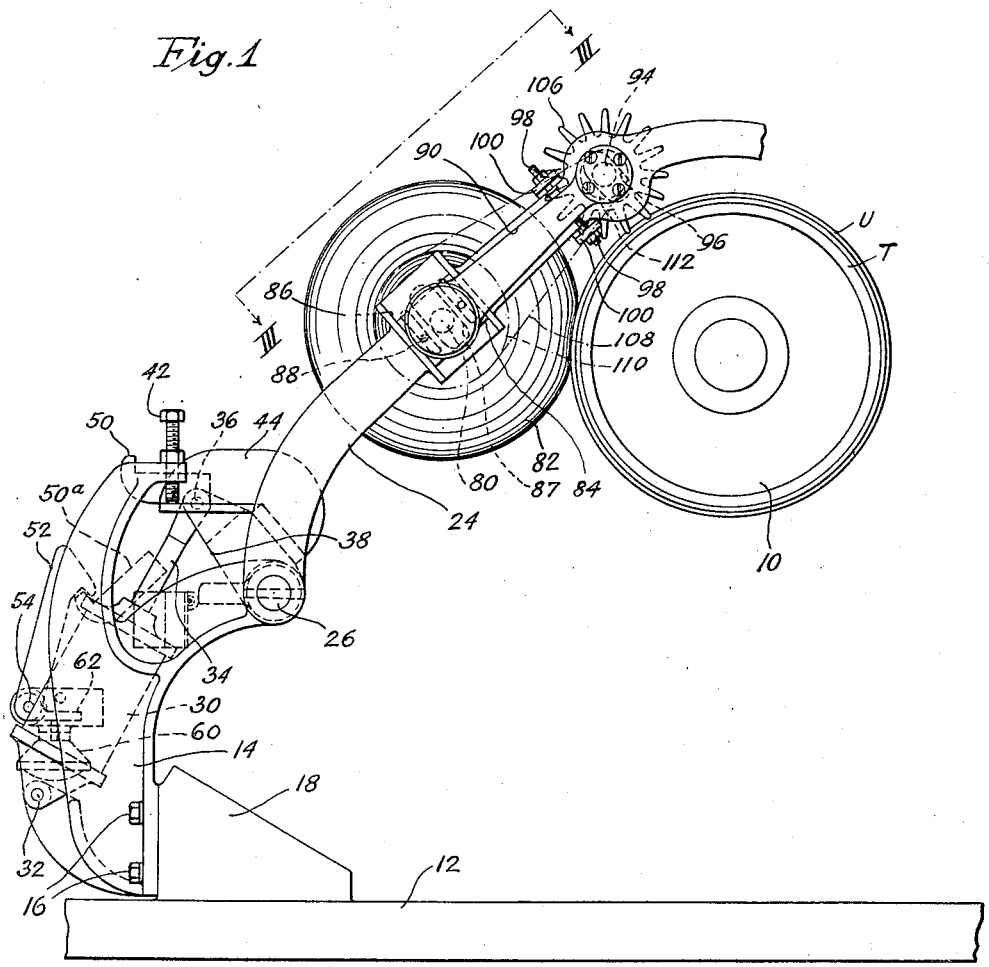

Feb. 20, 1945.   R. C. BATEMAN   2,369,998
TIRE BUILDING APPARATUS
Filed April 29, 1942   2 Sheets-Sheet 2
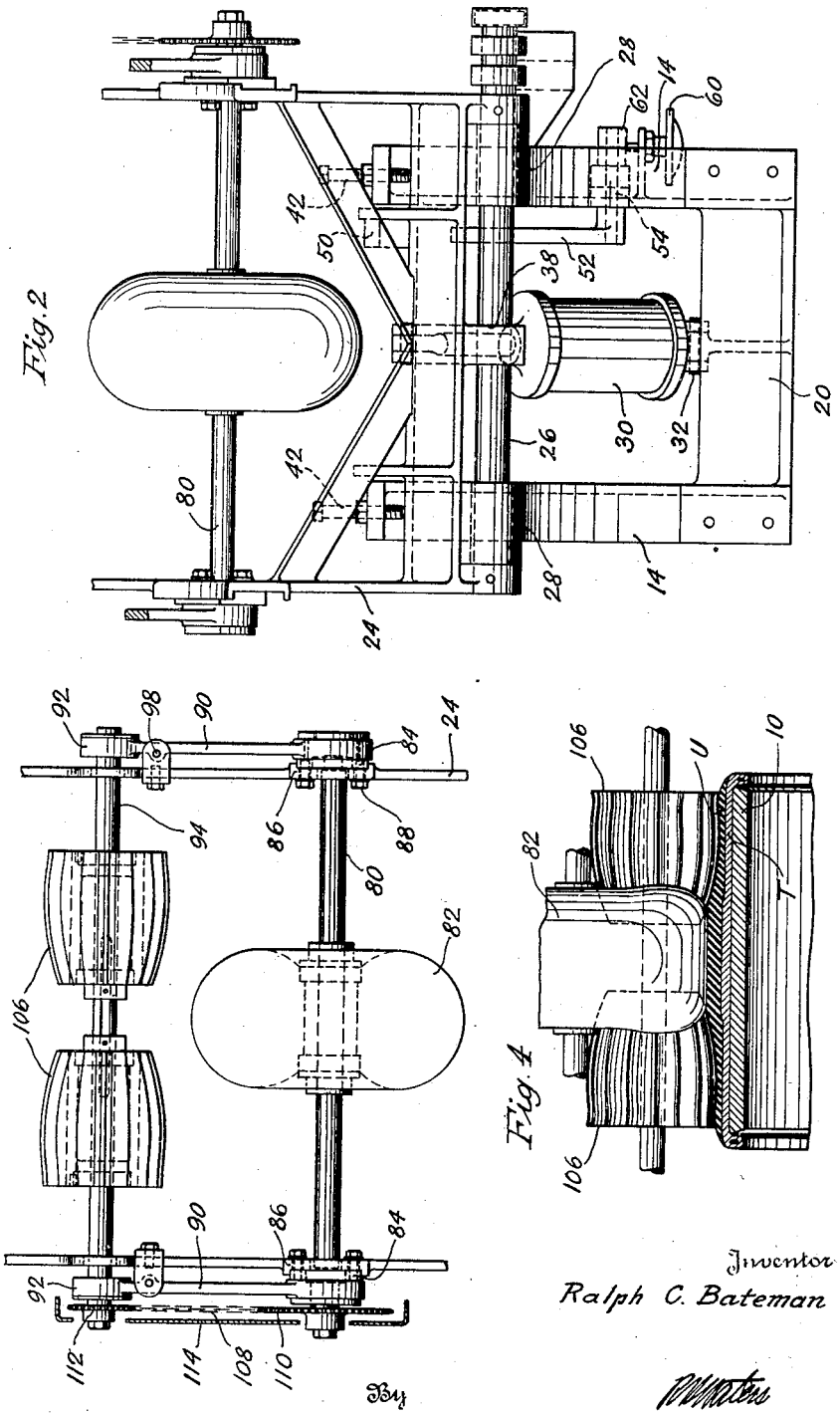
Inventor
Ralph C. Bateman Patented Feb. 20, 1945

2,369,998

UNITED STATES PATENT OFFICE 2,369,998

TIRE BUILDING APPARATUS

Ralph C. Bateman, Akron, Ohio, assignor to Wingfoot Corporation, Akron, Ohio, a corporation of Delaware Application April 29, 1942, Serial No. 440,919

6 Claims. (Cl. 154—9)

This invention relates to apparatus for building pneumatic tires, and, more particularly, is concerned with improved stitching mechanisms and drives therefor used in conjunction with tire building apparatus and adapted to join various parts of the tire carcass together during the building operation.

It is the general object of my invention to provide tire building apparatus having incorporated therein improved and particularly advantageous stitching, wiping, or other means regardless of the name applied thereto and adapted to roll, wipe, stitch, or otherwise secure together the various plies or other parts of a tire carcass during the building operation and with a minimum of wrinkling, puckering, trapping of air, and the like, said apparatus and mechanism being relatively inexpensive, easily handled, and rapid in operation.

Another object of my invention is the provision of improved stitching means and driving mechanisms therefore and adapted to be incorporated with the rotary drum of a tire building machine so that the stitching means is given a different, and usually a faster, surface speed than the surface speed of the rotary drum.

Another object of my invention is to provide a pneumatic tire, and specifically a doughnut type of pneumatic tire having relatively low inflation pressure, and engaging with a portion of the tire carcass during the building operation.

Another object of my invention is to provide stitching mechanisms in association with a rotary tire building drum and frictional driving means for the stitching mechanisms, said driving means engaging frictionally with a part of the rotary drum.

Another object of my invention is the provision of tire building apparatus having rubber paddle wheel stitching means driven by a rotary member engaging with a portion of the rotary drum.

Another object of my invention is to provide apparatus of the character described with the stitching mechanism and the drive therefor adapted to be swung or moved completely out of operative relation with the rotary drum so as to facilitate the building of the tire carcass on the drum.

For a better understanding of my invention reference should be had to the accompanying drawings where Fig. 1 illustrates, in side elevation, one embodiment of tire building apparatus incorporating the principles of my invention; Fig. 2 is an end elevation of the apparatus illustrated in Fig. 1 of the drawings; Fig. 3 is a fragmentary view of the stitching mechanism of Figs. 1 and 2 and taken substantially on line III—III of Fig. 1; and Fig. 4 is a diagrammatic sectional view of the rotary drum taken adjacent the stitching means and rotary drive.

In the drawings, the numeral 10 indicates a tire building drum of any of the well-known collapsible types and mounted in association with a tire building machine (the details of which, for purposes of simplification, have not been illustrated) so that the drum can be rotated about a horizontal axis, all in accordance with known means and methods. Built upon the drum 10 is the flat pulley carcass T of a pneumatic tire, and including a combined tread and sidewall unit U.

Supported on the base 12 of the tire building machine, or closely associated therewith, are a pair of upstanding brackets 14 which are spaced apart laterally of each other, and which may be secured, for example by cap screws 16, to bosses 18 formed or secured to the base 12. The brackets 14 are secured together by a cross bar 20, which may be formed integral therewith. The brackets 14 carry a frame 24 for movement towards and from operative relation to the drum 10, and this is conveniently achieved by providing a hinged or pivotal connection between the frame 24 and the brackets 14, which may be accomplished by the provision of a shaft 26 carried by the frame 24 in a position parallel to the axis of the drum 10 and received in suitable bearings 28 formed in the brackets 14.

The frame 24, which is of substantially square or rectangular shape, as shown, is moved to and from operative relation with the drum 10, for example, by the provision of an air cylinder 30. The air cylinder 30 is pivotally connected, as at 32, to the cross bar 20 and the piston rod 34 of the air cylinder 30 is pivotally connected, as at 36, to an arm 38 keyed to the shaft 26. Thus, movement of the piston in one direction in the air cylinder 30 causes the frame 24 to approach the drum 10, and movement of the piston in the other direction in the air cylinder 30 causes the frame 24 to swing away from the drum 10 about the shaft 26. The movement of the frame 24 towards the drum 10 is limited by means of a pair of set screws 42 adjustably carried by the upper ends of the brackets 14 and adapted to engage in abutting relation with flanged arms 44 carried by the frame 24.

Suitable means may be incorporated in the mechanism for locking the frame 24 in its inoperative position so that it cannot accidentally fall down into operative position upon a failure of air to the air cylinder 30. To this end, a finger 50 having an upstanding right angular end portion is secured to the arm 44 so that with the frame 24 in operative position the finger 50 extends substantially horizontally and the right angle end thereof extends substantially vertically. When, however, the frame 24 is retracted to its inoperative position the finger 50 moves down to the position indicated by the numeral 50a in Fig. 1. In this position the finger 50 has moved under the jaw of a latch 52 which has a beveled end portion so that the finger 50 will slide underneath of the latch.

The lower end of the latch 52 is pivotally secured, as at 54, to one of the brackets 14 so that the latch 52 engaging with the finger 50 in the position 50a will hold the frame 24 in an inoperative or substantially upright position. A plunger operating pressure unit 60 is mounted on the bracket 14 adjacent the pivot point 54, and the plunger of the unit 60 engages with a bell crank or arm portion 62 secured to the latch 52 so that operation of the pressure unit 60 will throw the bell crank lever 62, turn the latch 52 and release the finger 50 when it is desired to move the frame 24 from an inoperative position to an operative position adjacent the drum 10.

The frame 24 carries a shaft 80 upon which is supported a pneumatic tire 82. Preferably, the pneumatic tire 82 is of the doughnut or airwheel type, being relatively large in cross-section although of short bead diameters, and being inflated to a relatively low pressure. The shaft 80 is so positioned in the frame 24 that the pneumatic tire 82 engages with the center portion of the tread and sidewall unit U or of the tire carcass T being built on the rotary drum 10. Although preferable, it is not essential that the pneumatic tire engage with the center of the tire carcass being built, and I contemplate that it may engage with other portions of the tire or rotary drum, or even with an additional part carried by the drum. In any event, the engagement of the pneumatic tire 82 with the rotary drum or the tire carcass carried thereby causes the rotation of the pneumatic tire 82 and of the shaft 80.

The ends of the shaft 80 are journalled in suitable bearing blocks 84 which are mounted, as illustrated in the drawings, in guideways 86 formed in the sides of the frame. The center of the guideways are appropriately provided with oblong openings 87 to permit the free passage and rotation of the shaft 80 regardless of the position of the bearing blocks 84 in the guideways 86. The bearing blocks 84 are usually positioned by screw or other adjustable means 88 in the guideways 86.

Secured to the bearing blocks 84 by pivotal means are a pair of links 90 which are positioned substantially parallel to the sides of the frame 24. The links 90 rotatably support in suitable bearings 92 at their ends remote from the bearing blocks 84 a shaft 94 which extends freely through elongated openings 96 formed in the sides of the frame 24. The links 90 adjacent the shaft 94 are adjustably secured in relation to the frame 24 by set screws 98 extending through suitable brackets 100 secured to the frame 24. Thus, the position of the links 90 in relation to the frame 24 may be adjusted by the screws 88 and 98.

The shaft 94 carries one or more stitching, wiping, rolling, or other means adapted to effect the positive joinder of the various plies or rubber parts of the tire carcass being built upon the drum 10. One particularly advantageous form of stitching means is that illustrated in the drawings as comprising a pair of rubber paddle wheel-like means, or rubber gear means, each including a plurality of radially-directed, circumferentially-spaced, longitudinally-extending blades formed of rubber having substantially the strength, consistency, and resiliency of tire tread stock and usually molded integrally with a core or hub portion which is secured to the shaft 94. Stitching means of this type are disclosed and claimed in the patent application of Jorgen I. Haase, filed June 14, 1940, under Serial No. 340,-508, which application has matured into Patent #2,285,922 of June 9, 1942.

As seen in Fig. 3 of the drawings, the stitching means, each of which has been indicated as a whole by the numeral 106, are conveniently two in number, and are adjustably positioned so as to engage with the sidewalls of a tire carcass being built upon the drum 10. The inner ends of the stitching means 106 may be of smaller diameter than the center and outer ends in the use of the stitching means to effect the securing of the sidewall portions of the tire to the carcass. While I particularly employ the stitching means 106 to effect the union of the sidewall portions of the tire carcass, nevertheless, it should be understood that I broadly contemplate the use of suitable stitching, wiping, rolling, and like means wherever requisite or necessary in the tire building operation, and that these stitching means may make a wide variety of forms.

In any event, suitable driving means are employed to connect the shaft 80 with the shaft 94 so that the rotation of the shaft 80 effects a positive rotation of the shaft 94. Obviously, a wide variety of means may be employed to effect this driving connection, but in the form of the invention illustrated I have employed a chain 108 which extends between a sprocket 110 mounted on the end of the shaft 80 and a sprocket 112, usually of smaller diameter than the sprocket 110, and with the sprocket 112 being mounted upon the end of the shaft 94. A suitable guard or cover 114 may surround the chain 108 and the sprockets 110 and 112.

From the foregoing description it is believed that the operation of the apparatus will be understood. However, it should be noted here that the adjustment of the screws 88 and 98 permits the pneumatic tire 82 and the stitching means 106 to engage with the outer periphery of the building drum 10 or with the tire carcass being built thereon regardless of the exact diameter thereof. In other words, the links 90 can be adjusted together with the shafts 80 and 94 so that the outer periphery of the pneumatic tire 82 and the stitching means 106 engages firmly and with a desired pressure with the building drum 10 or the carcass carried thereby upon the operation of the air cylinder 30 to move the frame 24 into operative relation with the drum 10.

With the pneumatic tire 82 in firm engagement with the drum 10 or the carcass of the tire being built thereon, the pneumatic tire 82 is rotated by the rotation of the drum and this rotates the shaft 80 and through the chain 108 the shaft 94 is rotated to give the stitching means 106 a wiping, rolling, and stitching action on the sidewalls or other portions of the tire carcass engaged thereby. Preferably the relation of the sprockets 110 and 112 is such that the surface speed of the stitching means 106 is different than and preferably greater than the surface speed of the tire carcass on the rotary drum 10. Accordingly, a tucking-in action is produced. This action causes any excess length in the sidewalls of a combined tread in sidewall unit U to be worked in and the wiping action of the stitching means causes the sidewalls to be securely attached to the tire carcass.

Further, the pneumatic tire 82 has a stitching or rolling action of its own which is particularly beneficial in securing firm engagement of the tread portion of the combined tread and sidewall unit U to the carcass of the tire being built. It is often the practice today in tire building operation to lay a combined tread and sidewall unit U in on the surface of the ply carcass T on the building drum and to then slowly revolve the drum and apply the tread and sidewall unit progressively circumferentially of the drum. The pneumatic tire 82 may be used to assist in this operation, or the entire frame 24 may be swung to an inoperative position during the building of the ply carcass T of the tire and during the time the combined tread and sidewall unit U is applied to the carcass.

From the foregoing it will be recognized that the various objects of my invention have been achieved by the provision of improved tire building apparatus having, in particular, new and useful stitching, rolling or wiping mechanism associated therewith and adapted for operations in conjunction with tire building drums of various sizes.

While in accordance with the patent statutes I have particularly illustrated and described one embodiment of my invention, I am not to be limited there to or thereby, but the scope of my invention is defined in the appended claims.

I claim:

1. Tire building apparatus including a laterally-flat rotary drum on which the tire is built in flat band form, stitching means mounted for rotation about an axis parallel to the axis of the drum and adapted upon rotation of the drum to stitch down side wall portions of a slab of rubber constituting the outer part of the tire on the drum, a rotary member adapted to roll down and be driven by the central portion of said slab of rubber, interconnecting means between the rotary member and the stitching means and adapted, upon rotation of the drum to rotate the stitching means at a different surface speed than the surface speed of the building material on the drum, a frame carrying the stitching means and the rotary member, and means for moving the frame to associate or disassociate the stitching means and rotary member with the drum, said rotary member and stitching means together operating simultaneously over the full width of the drum.

2. Tire building apparatus including a rotary drum on which the tire is built in flat band form, stitching means mounted for rotation about an axis parallel to the axis of the drum and adapted upon rotation of the drum, to stitch down rubber side wall portions of the tire on the drum, a rotary member adapted to be driven by the central part of the rotary drum, and interconnecting means between the rotary member and the stitching means and adapted upon rotation of the drum to rotate the stitching means at a different surface speed than the surface speed of the building material on the drum, said rotary member and stitching means together operating simultaneously over the full width of the drum.

3. The combination in tire building apparatus of a rotary building drum, rubber paddle wheel stitching means adapted to engage with both the sidewall portions of a tie built on the drum, a large soft doughnut type pneumatic tire wheel adapted to engage in rolling contact with the tread portion of a tire built on the drum, driving means connecting the wheel and stitching means so that the rotation of the wheel drives the stitching means at a surface speed greater than the surface speed of the sidewall portions of the tire being built on the drum, means for supporting the stitching means and the wheel with their axes substantially parallel with that of the building drum, means for moving the supporting means to position the wheel and stitching means in operative or inoperative position, and additional means for adjustably changing the angular position of the center line between the axes of the wheel and the stitching means with respect to a vertical line through the axis of the drum, whereby desired stitching and wheel pressures on a variety of drum sizes can be obtained.

4. The combination in tire building apparatus of a rotary building drum, rubber paddle wheel stitching means adapted to engage with both the sidewall portions of a tire built on the drum, a large soft doughnut type pneumatic tire wheel adapted to engage in rolling contact with the tread portion of a tire built on the drum, driving means connecting the wheel and stitching means so that the rotation of the wheel drives the stitching means at a surface speed greater than the surface speed of the sidewall portions of the tire being built on the drum, means for supporting the stitching means and the wheel with their axes substantially parallel with that of the building drum, and means for moving the supporting means to position the wheel and stitching means in operative or inoperative position.

5. The combination in tire building apparatus of a rotary building drum, stitching means adapted to engage simultaneously with the full width of the sidewall portions of a tire built on the drum, a wide pneumatic tire wheel adapted to engage in compressing and rolling relation with the full width of the tread portion of a tire built on the drum, and driving means connecting the wheel and stitching means so that the rotation of the wheel drives the stitching means, said stitching means and wheel together engaging with the full width of the tire simultaneously.

6. The combination in tire building apparatus of a rotary building drum, stitching means adapted to engage with a tire built on the drum, a pneumatic tire wheel adapted to engage in rolling relation with a tire built on the drum, driving means connecting the wheel and stitching means so that the rotation of the wheel drives the stitching means, means for supporting the stitching means and the wheel, means for moving the supporting means to position the wheel and stitching means in operative or inoperative position, and additional means for adjustably changing the angular position of the center line between axes of the wheel and the stitching means with respect to a vertical line through the axis of the drum.

RALPH C. BATEMAN.